Figure 5:
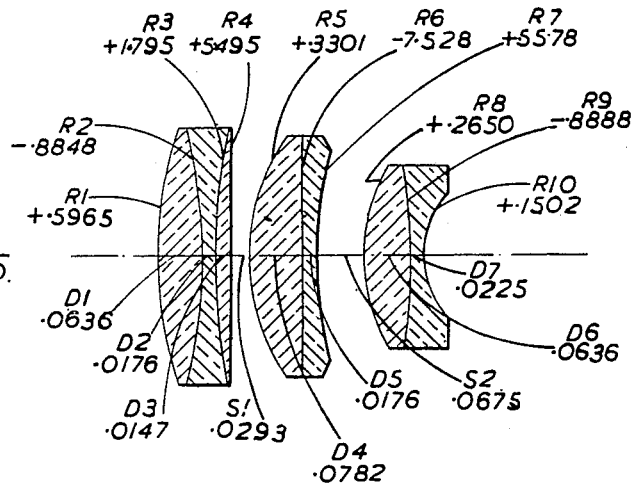

Jan. 2, 1945.    A. COX    2,366,597
OPTICAL OBJECTIVE
Filed Nov. 18, 1942    2 Sheets-Sheet 1
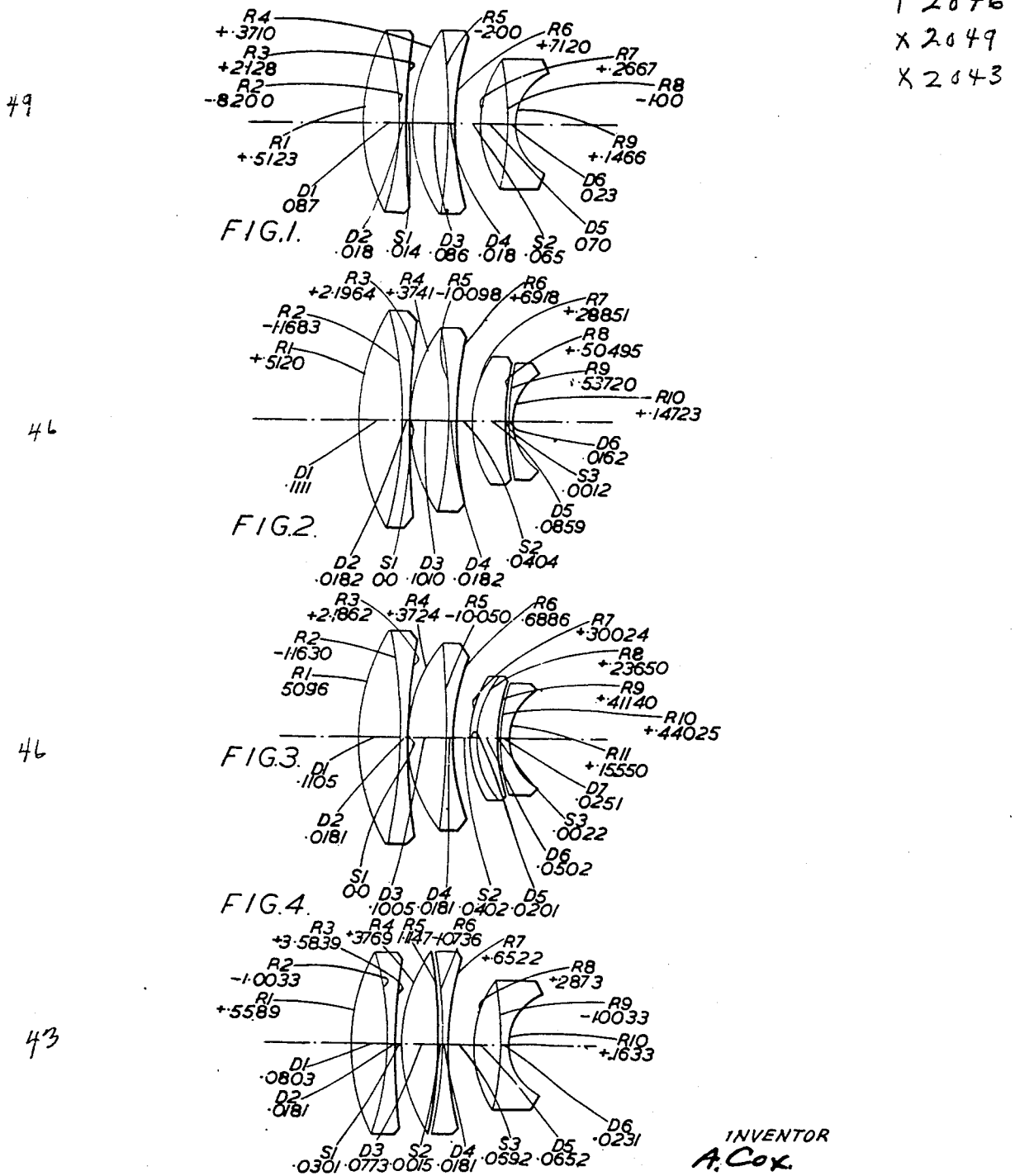

Jan. 2, 1945.    A. COX    2,366,597
OPTICAL OBJECTIVE
Filed Nov. 18, 1942    2 Sheets-Sheet 2

INVENTOR
A. Cox.
BY
ATTORNEYS

Patented Jan. 2, 1945

2,366,597

UNITED STATES PATENT OFFICE 2,366,597

OPTICAL OBJECTIVE

Arthur Cox, Leicester, England, assignor to Taylor, Taylor & Hobson Limited, Leicester, England, a company of Great Britain Application November 18, 1942, Serial No. 466,033
In Great Britain September 17, 1941

37 Claims. (Cl. 88—57)

This invention relates to optical objectives of the kind known as telephoto objectives which are corrected for spherical and chromatic aberrations, coma, astigmatism and field curvature, and in which the axial distance from the front surface of the objective to the back focal plane is materially less than in objectives of the conventional type of the same focal length and aperture. Such objectives usually comprise a convergent member disposed in front of and widely spaced from a divergent member, each member being composed of a group of two or more lens elements disposed close together and commonly (though not invariably) cemented together. It should perhaps be made clear that the "front" of the objective is to be understood as the side of the longer conjugate in accordance with the usual convention. In most such telephoto objectives the two members (whether having internal airgaps or not) are in meniscus form with their concave faces towards one another.

In order to provide correction for coma and astigmatism in such objectives, there is usually strong under-correction of spherical aberration in the front member balanced by strong over-correction thereof in the rear member, with the result that there is considerable under-corrected zonal spherical aberration in the objective.

The present invention has for its object to provide an improved telephoto objective giving much better zonal spherical aberration correction than hitherto, without detriment to the other corrections. This may be achieved according to the invention by departing to some extent from the conventional constructional form, by employing two convergent members disposed in front of a divergent member, each of the three members being formed of two or more elements, the two axial air spaces separating the three members each being less than one-eighth of the equivalent focal length of the objective.

The divergent rear member preferably has its front surface convex to the front and may be arranged in various ways. Thus this member may be compounded of two elements, each having mean refractive index greater than 1.6, and may have its contact surface either concave to the front or convex to the front. It should be made clear that the terms "compounded" and "contact surface" are used herein, whether or not the two cooperating surfaces between a pair of elements have exactly the same curvature and whether or not cement is actually employed to connect the surfaces with one another.

When the contact surface in the divergent rear member is concave, the materials of which the two elements are made preferably have mean refractive indices differing by less than .01, whilst when the contact surface is convex the Abbé-$\nu$ numbers for the two elements preferably differ by more than 25.0. In one convenient arrangement having a contact surface convex toward the front, the member comprises a convergent element in front of a divergent meniscus element. Whether this arrangement is employed or not, the divergent rear member preferably has one of its elements convergent and made of a material having an Abbé $\nu$ number less than 33.0.

In a further variant the rear member is compounded of three elements, and in this case the two contact surfaces are preferably both convex to the front. This modification affords greater latitude in the choice of the glasses used.

In all these alternative arrangements the rear surface of the divergent rear member preferably has a radius curvature lying between .125 and .35 times the equivalent focal length of the objective.

Each convergent member preferably includes a contact surface of negative power, and if such surface is cemented the difference between the mean refractive indices of the materials used for the elements on either side of such surface preferably lies between .04 and .30. In the front convergent member such contact surface is preferably concave to the front with a radius of curvature between 0.6 and 2.0 times the equivalent focal length of the objective. In the convergent second member the contact surface preferably has radius of curvature not less than the equivalent focal length of the objective, if convex to the front and not less than half such equivalent focal length if concave to the front. The front surface of the front convergent member is preferably convex to the front with a radius of curvature between .45 and .75 times the equivalent focal length of the objective.

Each convergent member may be compounded of a convergent element and a divergent element, and in such case the convergent element is preferably made of a material having higher Abbé $\nu$ number than that used for the divergent element. Alternatively, at least one of the convergent members may comprise three elements.

It is especially convenient in some instances to employ an alkaline halide crystal as the material of which one of the divergent elements of the objective is made, and in one arrangement one of the convergent members is in the form of a cemented triplet comprising a convergent element in front of two divergent elements of which one is made of potassium iodide crystal.

Figure 6:
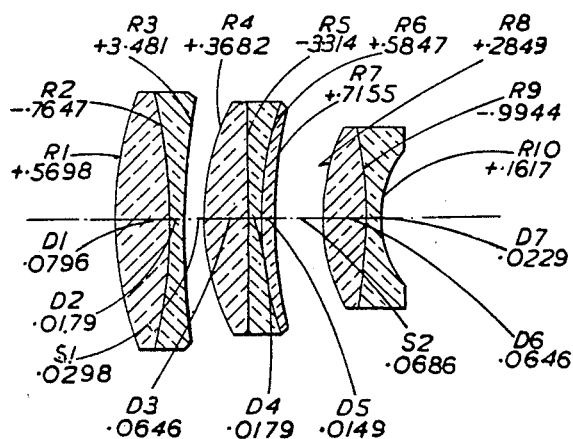
Figure 7:
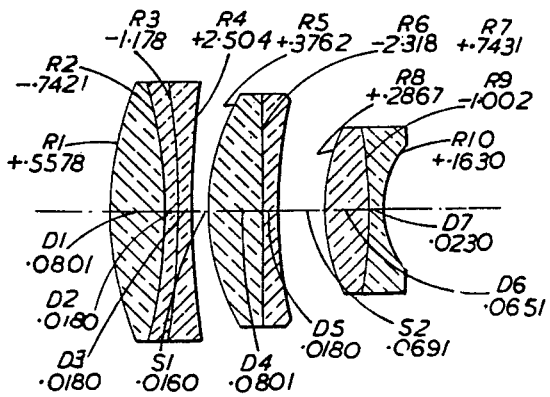

The invention may be carried into practice in various ways, but in the accompanying drawings, Figures 1 to 7 respectively illustrate diagrammatically seven convenient practical examples of telephoto objective according to the invention.

Numerical data for these examples are given in the following tables, in which $R_1R_2$ ... represent the radii of curvature of the individual surfaces counting from the front (the positive sign indicating that the surface is convex to the front and the negative sign that it is concave thereto) $D_1D_2$ ... represent the axial thicknesses of the individual elements, and $S_1S_2$ represent the axial air separations of the members from one another. The tables also give the mean refractive index $n_D$ (for the D-line) and the Abbé $\nu$ number of the glass used for each element.

*Example I*

| Equivalent focal length 1.000 | | Relative aperture F/2.5 | |
|---|---|---|---|
| Radius | Thickness or air separation | Refractive index $n_D$ | Abbé $\nu$ number |
| $R_1+$ .5123 | | | |
| | $D_1$ .087 | 1.613 | 57.6 |
| $R_2-$ .8200 | | | |
| | $D_2$ .018 | 1.699 | 30.3 |
| $R_3+$ 2.128 | | | |
| | $S_1$ .014 | | |
| $R_4+$ .3710 | | | |
| | $D_3$ .086 | 1.613 | 57.6 |
| $R_5-$ 2.00 | | | |
| | $D_4$ .018 | 1.699 | 30.3 |
| $R_6+$ .7120 | | | |
| | $S_2$ .065 | | |
| $R_7+$ .2667 | | | |
| | $D_5$ .070 | 1.652 | 33.5 |
| $R_8-$ 1.00 | | | |
| | $D_6$ .023 | 1.644 | 48.3 |
| $R_9+$ .1466 | | | |

It will be noticed that in this example all three members are meniscus doublets with their convex air-exposed surfaces turned towards the front and with their cemented surfaces concave to the front, and that the same pair of glasses is used for both convergent members.

With its front and rear surfaces convex to the front, the divergent rear member contributes only a small amount of spherical aberration, and the under-correction introduced by the front surface of the objective is now balanced by the over-correction distributed between the cemented surfaces in the two convergent members, although the over-correction may alternatively be mainly confined to one only of these cemented surfaces, if desired. The individual contributions of the surfaces to the over-correction and under-correction, whilst maintaining good correction for coma and astigmatism, can be made much smaller than in prior known arrangements and this in turn makes it possible to provide much improved zonal spherical aberration correction.

This example has the important advantage that for a relative aperture as high as F/2.5, the overall length of the objective from its front surface to its back focal plane (for an infinitely distant object) is less than seven eighths of the equivalent focal length.

The second and third examples differ from the first more especially in employing different types of divergent rear member and are both corrected for a relative aperture of F/2, the overall length of the objective from the front surface to the back focal plane being in each case less than nine tenths of the equivalent focal length as contrasted with figures such as 1.466 and 1.473 times the equivalent focal length for F/2 objectives of conventional type.

*Example II*

| Equivalent focal length 1.000 | | Relative aperture F/2 | |
|---|---|---|---|
| Radius | Thickness or air separation | Refractive index $n_D$ | Abbé $\nu$ number |
| $R_1+$ .5120 | | | |
| | $D_1$ .1111 | 1.613 | 59.3 |
| $R_2-$ 1.1683 | | | |
| | $D_2$ .0182 | 1.749 | 27.8 |
| $R_3+$ 2.1964 | | | |
| | $S_1$ 0.0 | | |
| $R_4+$ .3741 | | | |
| | $D_3$ .1010 | 1.613 | 59.3 |
| $R_5-$ 10.098 | | | |
| | $D_4$ .0182 | 1.749 | 27.8 |
| $R_6+$ .6918 | | | |
| | $S_2$ .0404 | | |
| $R_7+$ .28851 | | | |
| | $D_5$ .0859 | 1.749 | 27.8 |
| $R_8+$ .50495 | | | |
| | $S_3$ .0012 | | |
| $R_9+$ .53720 | | | |
| | $D_6$ .0162 | 1.613 | 59.3 |
| $R_{10}+$ .14723 | | | |

This example employs a doublet rear member in which the contact surface is convex to the front, and it will be particularly noted that this contact surface is broken, the two cooperating surfaces having slightly different radii of curvature.

*Example III*

| Equivalent focal length 1.000 | | Relative aperture F/2 | |
|---|---|---|---|
| Radius | Thickness or air separation | Refractive index $n_D$ | Abbé $\nu$ number |
| $R_1+$ .5096 | | | |
| | $D_1$ .1105 | 1.613 | 59.3 |
| $R_2-$ 1.1630 | | | |
| | $D_2$ .0181 | 1.749 | 27.8 |
| $R_3+$ 2.1862 | | | |
| | $S_1$ 0.0 | | |
| $R_4+$ .3724 | | | |
| | $D_3$ .1005 | 1.613 | 59.3 |
| $R_5-$ 10.050 | | | |
| | $D_4$ .0181 | 1.749 | 27.8 |
| $R_6+$ .6886 | | | |
| | $S_2$ .0402 | | |
| $R_7+$ .30024 | | | |
| | $D_5$ .0201 | 1.613 | 59.3 |
| $R_8+$ .23650 | | | |
| | $D_6$ .0502 | 1.749 | 27.8 |
| $R_9+$ .41140 | | | |
| | $S_3$ .0022 | | |
| $R_{10}+$ .44025 | | | |
| | $D_7$ .0251 | 1.613 | 59.3 |
| $R_{11}+$ .15550 | | | |

In this example the divergent rear member is in the form of a triplet having a convergent element between two divergent elements with both contact surfaces convex to the front. At least one of these contact surfaces should preferably be broken and in the actual example the front contact surface is cemented and the rear contact surface is broken.

The contact surfaces in the doublet convergent members in the first three examples are all cemented, but it is in some instances convenient to employ broken contacts, and one example thereof in which the contact surface in the front member is cemented and that in the second member is broken is illustrated in Figure 4 and has numerical data as set forth in the following table.

*Example IV*

| Equivalent focal length 1.000 | | Relative aperture F/2.5 | |
|---|---|---|---|
| Radius | Thickness or air separation | Refractive index $n_D$ | Abbé $\nu$ number |
| $R_1 + .5589$ | | | |
| | $D_1 .0803$ | 1.613 | 59.3 |
| $R_2 -1.0033$ | | | |
| | $D_2 .0181$ | 1.750 | 27.8 |
| $R_3 +3.5839$ | | | |
| | $S_1 .0301$ | | |
| $R_4 + .3769$ | | | |
| | $D_3 .0773$ | 1.613 | 59.3 |
| $R_5 -1.1147$ | | | |
| | $S_2 .0015$ | | |
| $R_6 -1.0736$ | | | |
| | $D_4 .0181$ | 1.621 | 36.1 |
| $R_7 + .6522$ | | | |
| | $S_3 .0692$ | | |
| $R_8 + .2873$ | | | |
| | $D_5 .0652$ | 1.647 | 33.5 |
| $R_9 -1.0333$ | | | |
| | $D_6 .0231$ | 1.644 | 48.3 |
| $R_{10}+ .1633$ | | | |

In the foregoing arrangements the convergent members are in each case of doublet construction, but it will be appreciated that these members may be in the form of triplets, if desired, and that there are a number of possible alternative ways of arranging convergent and divergent elements in such triplets, in conjunction with any of the alternative forms of divergent member referred to above. Three of such possible alternatives are illustrated by way of example in Figures 5 to 7 and numerical data thereof are given in the following tables.

*Example V*

| Equivalent focal length 1.000 | | Relative aperture F/2.5 | |
|---|---|---|---|
| Radius | Thickness or air separation | Refractive index $n_D$ | Abbé $\nu$ number |
| $R_1 + .5965$ | | | |
| | $D_1 .0636$ | 1.613 | 57.6 |
| $R_2 - .8848$ | | | |
| | $D_2 .0176$ | 1.699 | 30.5 |
| $R_3 +1.795$ | | | |
| | $D_3 .0147$ | 1.644 | 48.3 |
| $R_4 +5.495$ | | | |
| | $S_1 .0293$ | | |
| $R_5 + .3301$ | | | |
| | $D_4 .0782$ | 1.613 | 57.6 |
| $R_6 -7.528$ | | | |
| | $D_5 .0176$ | 1.699 | 30.5 |
| $R_7 + .5578$ | | | |
| | $S_2 .0675$ | | |
| $R_8 + .2650$ | | | |
| | $D_6 .0636$ | 1.647 | 33.9 |
| $R_9 - .8888$ | | | |
| | $D_7 .0225$ | 1.644 | 48.3 |
| $R_{10}+ .1502$ | | | |

*Example VI*

| Equivalent focal length 1.000 | | Relative aperture F/2.5 | |
|---|---|---|---|
| Radius | Thickness or air separation | Refractive index $n_D$ | Abbé $\nu$ number |
| $R_1 + .5698$ | | | |
| | $D_1 .0796$ | 1.613 | 57.6 |
| $R_2 - .7647$ | | | |
| | $D_2 .0179$ | 1.699 | 30.5 |
| $R_3 +3.481$ | | | |
| | $S_1 .0298$ | | |
| $R_4 + .3682$ | | | |
| | $D_3 .0646$ | 1.613 | 57.6 |
| $R_5 -3.314$ | | | |
| | $D_4 .0179$ | 1.699 | 30.5 |
| $R_6 + .5847$ | | | |
| | $D_5 .0149$ | 1.652 | 33.5 |
| $R_7 + .7155$ | | | |
| | $S_2 .0686$ | | |
| $R_8 + .2849$ | | | |
| | $D_6 .0646$ | 1.647 | 33.9 |
| $R_9 - .9944$ | | | |
| | $D_7 .0229$ | 1.644 | 48.3 |
| $R_{10}+ .1617$ | | | |

*Example VII*

| Equivalent focal length 1.000 | | Relative aperture F/2.5 | |
|---|---|---|---|
| Radius | Thickness or air separation | Refractive index $n_D$ | Abbé $\nu$ number |
| $R_1 + .5578$ | | | |
| | $D_1 .0801$ | 1.613 | 44.5 |
| $R_2 - .7421$ | | | |
| | $D_2 .0180$ | 1.699 | 30.5 |
| $R_3 -1.178$ | | | |
| | $D_3 .0180$ | 1.6634 | 21.4 |
| $R_4 +2.504$ | | | |
| | $S_1 .0160$ | | |
| $R_5 + .3762$ | | | |
| | $D_4 .0801$ | 1.613 | 57.6 |
| $R_6 -2.318$ | | | |
| | $D_5 .0180$ | 1.699 | 30.5 |
| $R_7 + .7431$ | | | |
| | $S_2 .0691$ | | |
| $R_8 + .2867$ | | | |
| | $D_6 .0651$ | 1.647 | 33.9 |
| $R_9 -1.002$ | | | |
| | $D_7 .0230$ | 1.644 | 48.3 |
| $R_{10}+ .1630$ | | | |

In Examples V and VII the front convergent member is of cemented triplet construction with the first contact surface $R_2$ concave to the front and of radius between 0.7 and 2.0 times the equivalent focal length of the objective, and with an index difference of .086 across such surface, whilst the convergent second member is a cemented doublet with its contact surface concave to the front and of large radius. In Example V the front member has two convergent elements enclosing a divergent element, whilst in Example VI a convergent element is in front of two divergent elements.

Example VI shows the converse arrangement, the convergent front member being a cemented doublet with a contact surface concave to the front and of radius between 0.7 and 2.0 times the equivalent focal length and with an index difference .086 across it, whilst the convergent second member is of cemented triplet construction having one contact surface $R_5$ concave to the front and of large radius. The second member has two convergent elements enclosing a divergent element.

In Examples V, VI and VII, the front surface of the convergent front member is strongly collective and has radius between .45 and .75 times the equivalent focal length of the objective.

Example VII differs from the other examples in employing an alkaline halide crystal in place of optical glass for one of the divergent elements of the objective. This with suitable choice of the glasses used for the other elements enables a considerably improved correction for secondary spectrum to be obtained in a manner which in itself forms the subject of the United States of America patent application Serial No. 423,118. In the actual example potassium iodide crystal is used for the divergent rear element of the convergent triplet front member. It will be appreciated that this example again is given as one of a number of possible variants employing an alkaline halide crystal for a divergent element in one of the three members.

What I claim as my invention and desire to secure by Letters Patent is:

1. A telephoto objective corrected for spherical and chromatic aberrations, coma, astigmatism and field curvature, and comprising three members in axial alignment, of which the front two are convergent and the third is divergent, each of the three members being formed of at least two elements all three members being of meniscus form with outer surfaces convex to the front, the two axial air spaces separating the three members each being less than one-eighth of the equivalent focal length of the objective, the front air space being between zero and one-eighth and rear air space between one-fiftieth and one-eighth of equivalent focal length.

2. A telephoto objective corrected for spherical and chromatic aberrations, coma, astigmatism and field curvature, and comprising three members in axial alignment, the front two members being convergent and each formed of at least two elements, whilst the rear member is in the form of a divergent doublet and has the mean refractive indices of the materials used for its two elements each greater than 1.6, all three members being of meniscus form with outer surfaces convex to the front, the two axial air spaces separating the three members each being less than one-eighth of the equivalent focal length of the objective, the front air space being between zero and one-eighth and rear air space between one-fiftieth and one-eighth of equivalent focal length.

3. A telephoto objective as claimed in claim 2, in which the contact surface between the two elements of the divergent rear member is concave to the front and the mean refractive indices of the materials used for such elements differ from one another by less than .01.

4. A telephoto objective as claimed in claim 2, in which the divergent rear member has its contact surface cemented and concave to the front.

5. A telephoto objective as claimed in claim 2, in which the contact surface between the two elements of the divergent rear member is convex to the front and the Abbé $\nu$ numbers of the materials used for such elements differ from one another by more than 25.0.

6. A telephoto objective as claimed in claim 2, in which the divergent rear member consists of a convergent meniscus element in front of a divergent meniscus element, all its surfaces being convex to the front.

7. A telephoto objective as claimed in claim 2, in which the contact surface between the two elements of the divergent rear member is convex to the front, one of such elements being convergent and made of a material having an Abbé $\nu$ number less than 33.0.

8. A telephoto objective as claimed in claim 2, in which the divergent rear member consists of a convergent meniscus element in front of a divergent meniscus element, all its surfaces being convex to the front, the Abbé $\nu$ number of the material used for the convergent element being less than 33.0 and differing from that of the divergent element by more than 25.0.

9. A telephoto objective as claimed in claim 2, in which the divergent rear member consists of a convergent meniscus element in front of a divergent meniscus element with a thin meniscus-shaped air space between the two elements, all its surfaces being convex to the front.

10. A telephoto objective corrected for spherical and chromatic aberrations, coma, astigmatism and field curvature, and comprising three members in axial alignment of which the front two are convergent and are each formed of at least two elements, whilst the third is divergent and is formed of three elements with its internal surfaces convex to the front, all three members being of meniscus form with outer surfaces convex to the front, the two axial air spaces separating the three members each being less than one-eighth of the equivalent focal length of the objective, the front air space being between zero and one-eighth and rear air space between one-fiftieth and one-eighth of equivalent focal length.

11. A telephoto objective corrected for spherical and chromatic aberrations, coma, astigmatism and field curvature, and comprising three members in axial alignment of which the front two are convergent and are each formed of at least two elements, whilst the third is divergent and is formed of a convergent element disposed between two divergent elements and separated from at least one of them by a thin meniscus-shaped air space, all three members being of meniscus form with outer surfaces convex to the front, all the surfaces of the divergent rear member being convex to the front, the front air space being between zero and one-eighth and rear air space between one-fiftieth and one-eighth of equivalent focal length.

12. A telephoto objective as claimed in Claim 1, in which the rear surface of the divergent rear member has a radius of curvature between .125 and .35 times the equivalent focal length of the objective.

13. A telephoto objective corrected for spherical and chromatic aberrations, coma, astigmatism and field curvature, and comprising three members in axial alignment, each of meniscus form with its air-exposed surfaces convex to the front, the front two members being convergent and the third divergent and each of the three members being formed of at least two elements, the radius of curvature of the rear surface of the divergent rear member lying between .125 and .35 times the equivalent focal length of the whole objective, all three members being of meniscus form with outer surfaces convex to the front, and the front air space being between zero and one-eighth and rear air space between one-fiftieth and one-eighth of equivalent focal length.

14. A telephoto objective as claimed in claim 13, in which the two axial air spaces separating the three members are each less than one-eighth of the equivalent focal length of the objective, whilst the divergent rear members consists of two elements each made of a material having mean refractive index greater than 1.6.

15. A telephoto objective as claimed in claim 13, in which the two axial air spaces separating the three members are each less than one-eighth of the equivalent focal length of the objective, whilst the divergent rear member consists of three elements with its internal surfaces convex to the front.

16. A telephoto objective as claimed in claim 1, in which the front surface of the front convergent member has a radius of curvature lying between .45 and .75 times the equivalent focal length of the objective.

17. A telephoto objective as claimed in claim 13, in which the front surface of the front convergent member is convex to the front and has a radius of curvature lying between .45 and .75 times the equivalent focal length of the objective.

18. A telephoto objective as claimed in claim 1, in which the front convergent member consists of a double-convex convergent element disposed in front of a divergent element, the radius of curvature of its front surface lying between .45 and .75 times the equivalent focal length of the objective, whilst that of its contact surface lies between .6 and 2.0 times such equivalent focal length.

19. A telephoto objective as claimed in claim 1, in which each convergent member consists of a convergent element in front of a divergent element, the internal surface in the second member having radius of curvature not less than the equivalent focal length of the objective if convex to the front and not less than half such equivalent focal length if concave to the front.

20. A telephoto objective as claimed in claim 2, in which each convergent member consists of a convergent element cemented in front of a divergent element.

21. A telephoto objective as claimed in claim 11, in which each convergent member consists of a convergent element cemented in front of a divergent element.

22. A telephoto objective as claimed in claim 1, in which each convergent member includes a contact surface of negative power.

23. A telephoto objective as claimed in claim 1, in which each convergent member includes a cemented contact surface of negative power, the difference between the mean refractive indices of the materials used for the elements on either side of such surface lying between .04 and .30.

24. A telephoto objective as claimed in claim 1, in which the front convergent member includes a cemented contact surface of negative power concave to the front and having radius of curvature between 0.7 and 2.0 times the equivalent focal length of the objective, the difference between the mean refractive indices of the materials used for the elements on either side of such surface lying between .04 and .30.

25. A telephoto objective as claimed in claim 1, in which the convergent second member includes a cemented contact surface of negative power having radius of curvature greater than the equivalent focal length of the objective, the difference between the mean refractive indices of the materials used for the elements on either side of such surface lying between .04 and .30.

26. A telephoto objective as claimed in claim 13, in which each convergent member includes a contact surface of negative power, at least one of such surfaces being cemented, the difference between the mean refractive indices of the materials used for the elements on either side of such cemented surface lying between .04 and .30.

27. A telephoto objective as claimed in claim 13, in which the front convergent member includes a contact surface of negative power concave to the front and having radius of curvature between 0.6 and 2.0 times the equivalent focal length of the objective, whilst the convergent second member includes a contact surface of negative power having radius of curvature greater than such equivalent focal length if convex to the front and greater than half such equivalent focal length if concave to the front.

28. A telephoto objective as claimed in claim 1, in which each convergent member consists of a convergent element and a divergent element the material used for the convergent element having greater Abbé $\nu$ number than that used for the divergent element.

29. A telephoto objective as claimed in claim 1, in which at least one of the convergent members comprises three elements.

30. A telephoto objective as claimed in claim 13, in which at least one of the convergent members comprises three elements, the front surface of the front member being convex to the front and having a radius of curvature between .45 and .75 times the equivalent focal length of the objective.

31. A telephoto objective as claimed in claim 1, in which the front convergent member comprises three elements and includes a contact surface of negative power concave to the front and having radius of curvature between 0.6 and 2.0 times the equivalent focal length of the objective.

32. A telephoto objective as claimed in claim 1, in which one of the divergent elements of the objectives is made of an alkaline halide crystal.

33. A telephoto objective as claimed in claim 1, in which one of the members of the objective comprises three elements, of which one is divergent and is made of an alkaline halide crystal.

34. A telephoto objective as claimed in claim 1, in which one of the convergent members is in the form of a cemented triplet comprising a convergent element in front of two divergent elements, one of which is made of potassium iodide crystal.

35. A telephoto objective having numerical data substantially as set forth in the following table:

| Equivalent focal length 1.000 | | Relative aperture F/2 | |
|---|---|---|---|
| Radius | Thickness or air separation | Refractive index $n_D$ | Abbé $\nu$ number |
| $R_1 +$ .5120 | $D_1$ .1111 | 1.613 | 59.3 |
| $R_2 -$ 1.1683 | $D_2$ .0182 | 1.749 | 27.8 |
| $R_3 +$ 2.1964 | $S_1$ 0.0 | | |
| $R_4 +$ .3741 | $D_3$ .1010 | 1.613 | 59.3 |
| $R_5 -$ 10.098 | $D_4$ .0182 | 1.749 | 27.8 |
| $R_6 +$ .6918 | $S_2$ .0404 | | |
| $R_7 +$ .28851 | $D_5$ .0859 | 1.749 | 27.8 |
| $R_8 +$ .50495 | $S_3$ .0012 | | |
| $R_9 +$ .53720 | $D_6$ .0162 | 1.613 | 59.3 |
| $R_{10}+$ .14723 | | | | in which $R_1R_2$ . . . represent the radii of curvature of the individual surfaces counting from the front (the positive sign indicating that the surface is convex to the front and the negative sign that it is concave thereto) $D_1D_2$ . . . represent the axial thicknesses of the individual elements, and $S_1S_2$ represent the axial air separations of the members from one another.

36. Telephoto objective having numerical data substantially as set forth in the following table:

| Equivalent focal length 1.000 | | Relative aperture F/2 | |
|---|---|---|---|
| Radius | Thickness or air separation | Refractive index $n_D$ | Abbé $\nu$ number |
| $R_1 +\ .5096$ | $D_1\ .1105$ | 1.613 | 59.3 |
| $R_2 -\ 1.1630$ | $D_2\ .0181$ | 1.749 | 27.8 |
| $R_3 +\ 2.1862$ | $S_1\ 0.0$ | | |
| $R_4 +\ .3724$ | $D_3\ .1005$ | 1.613 | 59.3 |
| $R_5 -10.050$ | $D_4\ .0181$ | 1.749 | 27.8 |
| $R_6 +\ .6886$ | $S_2\ .0402$ | | |
| $R_7 +\ .30024$ | $D_5\ .0201$ | 1.613 | 59.3 |
| $R_8 +\ .23650$ | $D_6\ .0502$ | 1.749 | 27.8 |
| $R_9 +\ .41140$ | $S_3\ .0022$ | | |
| $R_{10}+\ .44025$ | $D_7\ .0251$ | 1.613 | 59.3 |
| $R_{11}+\ .15550$ | | | | in which $R_1 R_2$ . . . represent the radii of curvature of the individual surfaces counting from the front (the positive sign indicating that the surface is convex to the front and the negative sign that it is concave thereto) $D_1 D_2$ . . . represent the axial thicknesses of the individual elements, and $S_1 S_2$ represent the axial air separations of the members from one another.

37. A telephone objective having numerical data substantially as set forth in the following table:

| Equivalent focal length 1.000 | | Relative aperture F/2.5 | |
|---|---|---|---|
| Radius | Thickness or air separation | Refractive index $n_D$ | Abbé $\nu$ number |
| $R_1 +\ .5578$ | $D_1\ .0801$ | 1.613 | 44.5 |
| $R_2 -\ .7421$ | $D_2\ .0180$ | 1.699 | 30.5 |
| $R_3 -1.178$ | $D_3\ .0181$ | 1.6634 | 21.4 |
| $R_4 +2.504$ | $S_1\ .0161$ | | |
| $R_5 +\ .3762$ | $D_4\ .0801$ | 1.613 | 57.6 |
| $R_6 -2.318$ | $D_5\ .0180$ | 1.699 | 30.5 |
| $R_7 +\ .7431$ | $S_2\ .0691$ | | |
| $R_8 +\ .2867$ | $D_6\ .0651$ | 1.647 | 33.9 |
| $R_9 -1.002$ | $D_7\ .0230$ | 1.644 | 48.3 |
| $R_{10}+\ .1630$ | | | | in which $R_1 R_2$ . . . represent the radii of curvature of the individual surfaces counting from the front (the positive sign indicating that the surface is convex to the front and the negative sign that it is concave thereto) $D_1 D_2$ . . . represent the axial thicknesses of the individual elements, and $S_1 S_2$ represent the axial air separations of the members from one another.

ARTHUR COX.